United States Patent
Sakanaka et al.

(10) Patent No.: US 8,401,707 B2
(45) Date of Patent: Mar. 19, 2013

(54) OUTPUT-POWER CONTROL APPARATUS

(75) Inventors: Yoshinori Sakanaka, Tokyo (JP);
Matsuo Bando, Tokyo (JP); Tomio Tamakoshi, Nagoya (JP)

(73) Assignee: Japan Wind Development Corporation Ltd., Tokyo (JP)

( * ) Notice: Subject to any disclaimer, the term of this patent is extended or adjusted under 35 U.S.C. 154(b) by 0 days.

(21) Appl. No.: 13/110,346

(22) Filed: May 18, 2011

(65) Prior Publication Data

US 2011/0282503 A1 Nov. 17, 2011

Related U.S. Application Data

(63) Continuation of application No. PCT/JP2008/071039, filed on Nov. 19, 2008.

(51) Int. Cl.
*G06F 1/28* (2006.01)
*H02J 3/32* (2006.01)

(52) U.S. Cl. ............... 700/287; 307/44; 307/47; 307/48

(58) Field of Classification Search ................... 700/287; 290/44, 50; 307/44, 48, 60, 66; 320/101
See application file for complete search history.

(56) References Cited

U.S. PATENT DOCUMENTS

| | | | |
|---|---|---|---|
| 2003/0015876 A1* | 1/2003 | Ichinose et al. | 290/44 |
| 2008/0179887 A1* | 7/2008 | Kawazoe et al. | 290/44 |
| 2008/0224541 A1* | 9/2008 | Fukuhara | 307/48 |

FOREIGN PATENT DOCUMENTS

| | | |
|---|---|---|
| JP | 8-308104 | 11/1996 |
| JP | 2002-44867 | 2/2002 |
| JP | 2003-333752 | 11/2003 |
| JP | 2008-182859 | 8/2008 |

OTHER PUBLICATIONS

International Search Report from the Japanese Patent Office in International Application No. PCT/JP2008/071039, mailed Jan. 27, 2009.
Nakabayashi, et al.: "The January Issue of Monthly Energy", The Nikkan Kogyo Shimbun, Ltd.; Dec. 28, 2004; pp. 82-84.

\* cited by examiner

*Primary Examiner* — Sean Shechtman
*Assistant Examiner* — Steven Garland
(74) *Attorney, Agent, or Firm* — Holtz, Holtz, Goodman & Chick, P.C.

(57) ABSTRACT

An output-power control apparatus is provided in an electric power system connecting a secondary battery system and a power generator in parallel, and controls output power of the electric power system. The output-power control apparatus detects output power of the power generator, and controls output voltage of the secondary battery system, based on a value obtained by subtracting the detected output power of the power generator from an output power instruction for controlling the output power.

28 Claims, 7 Drawing Sheets

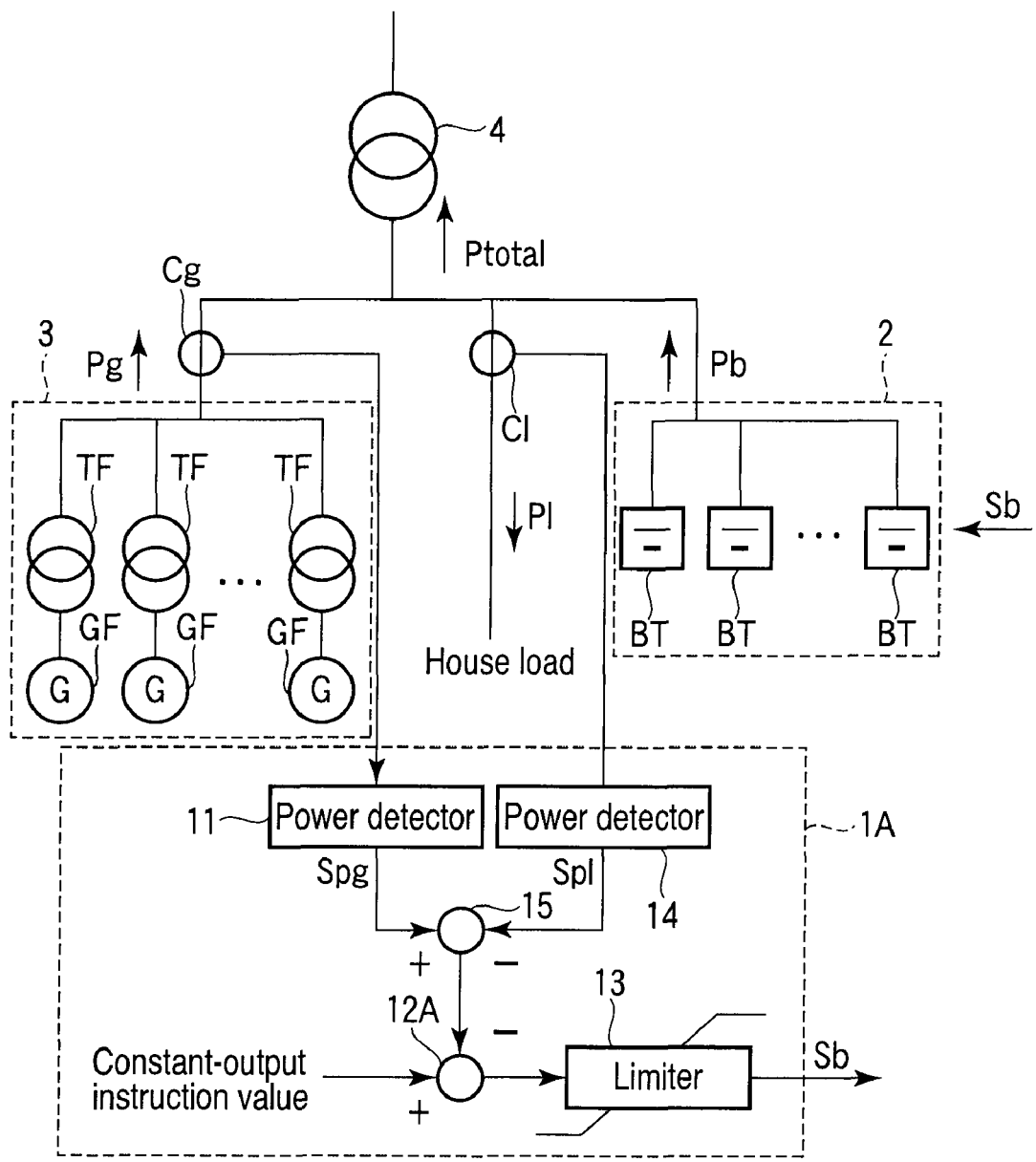
F I G. 2

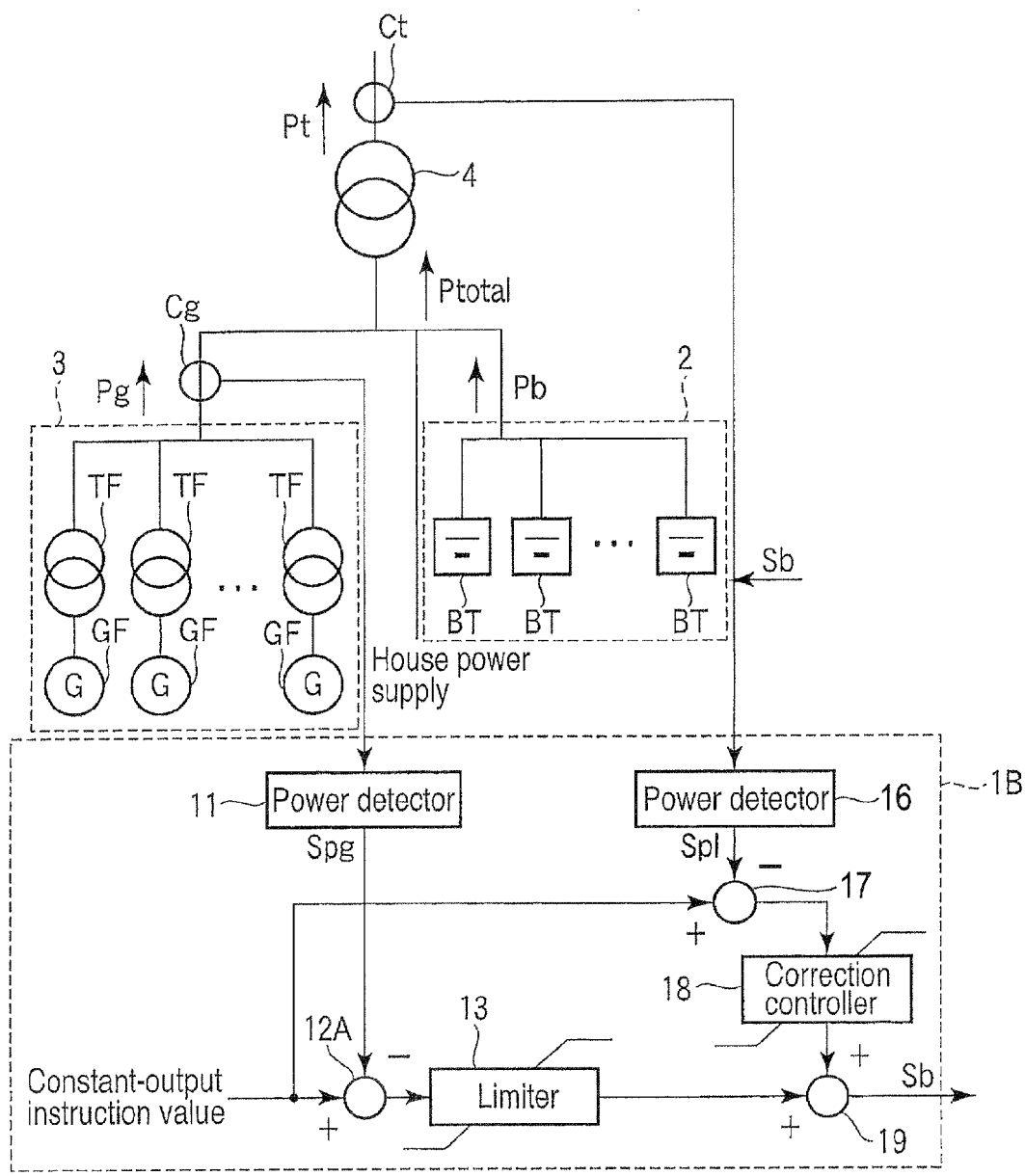
F I G. 3

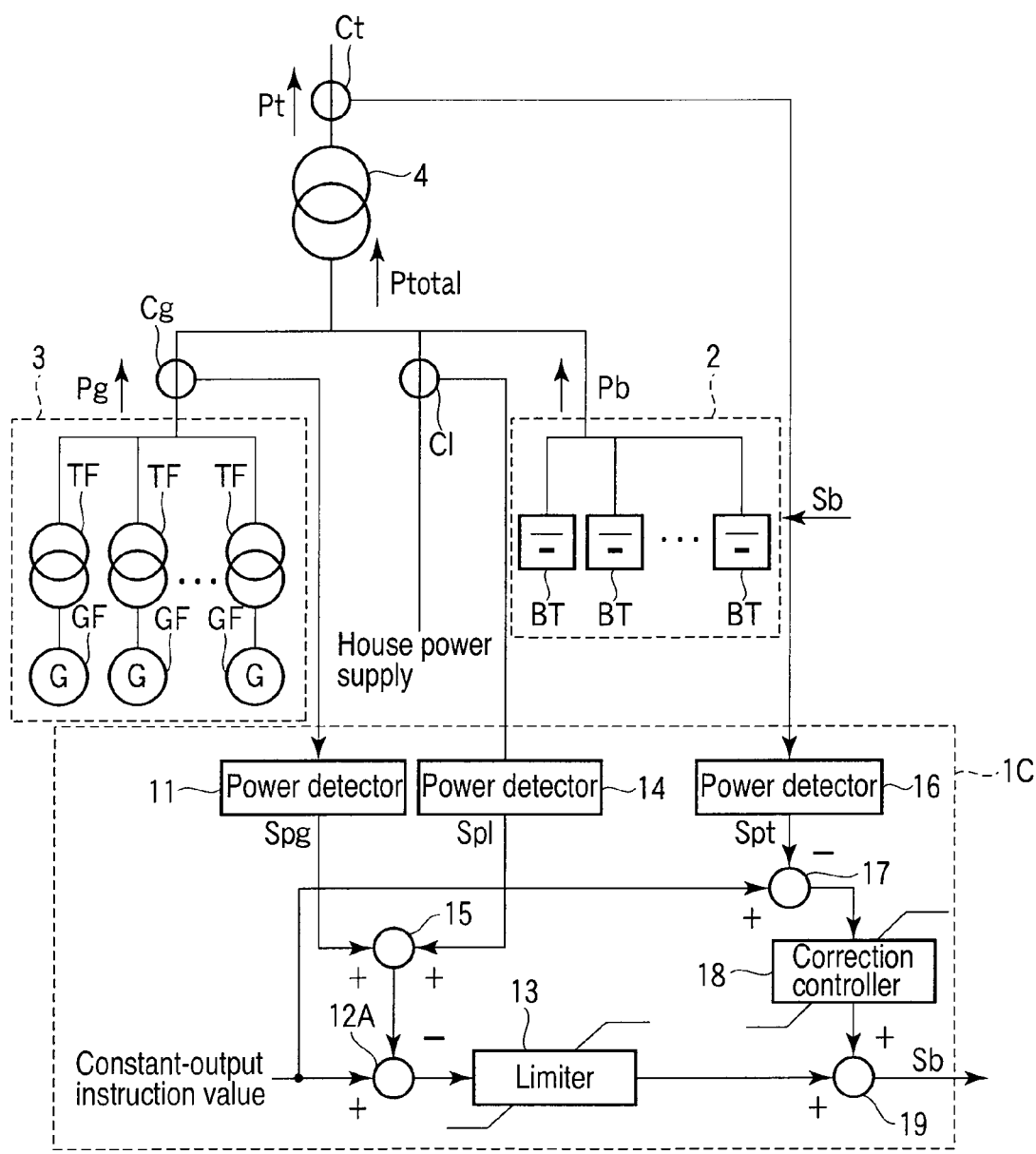
F I G. 4

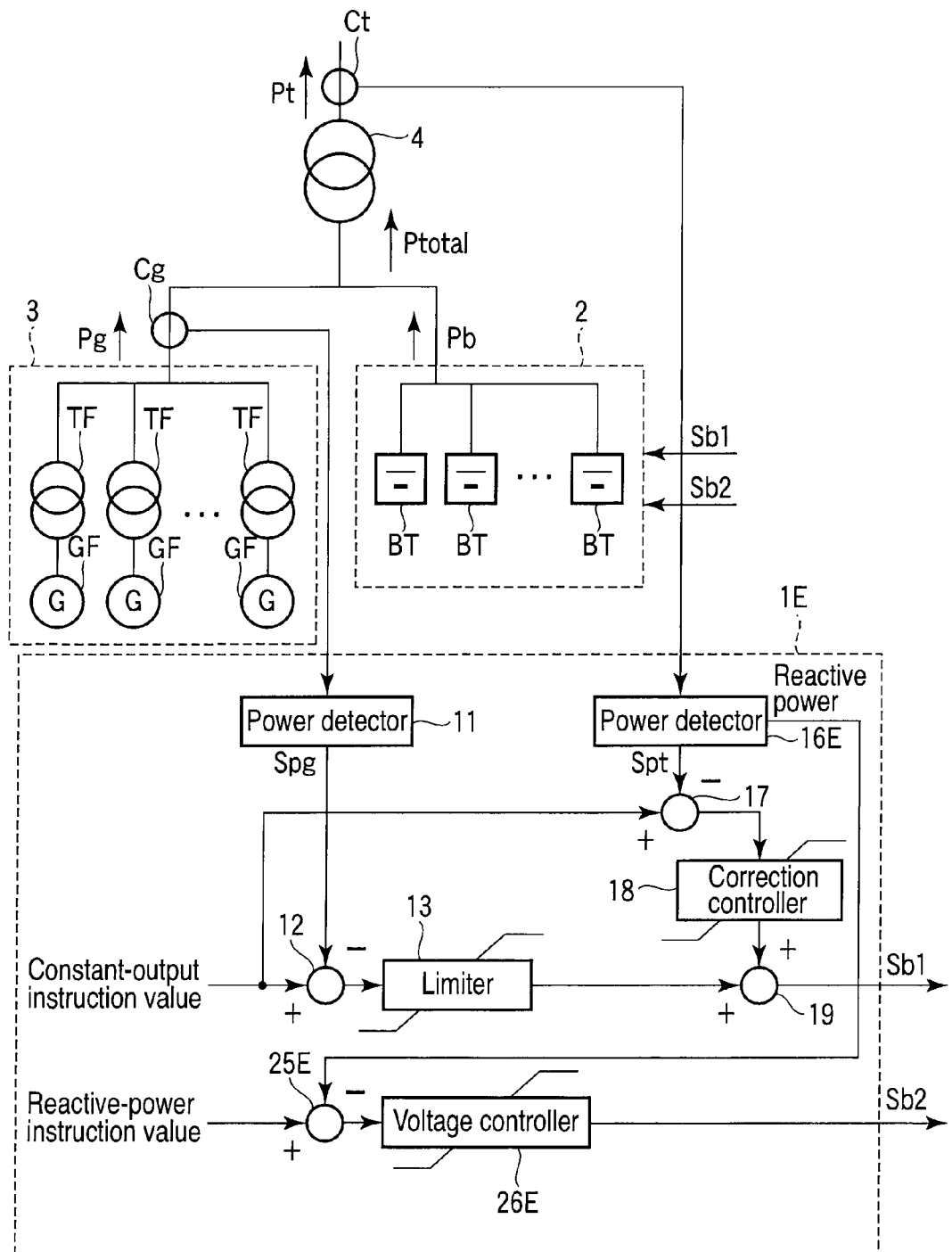
F I G. 6

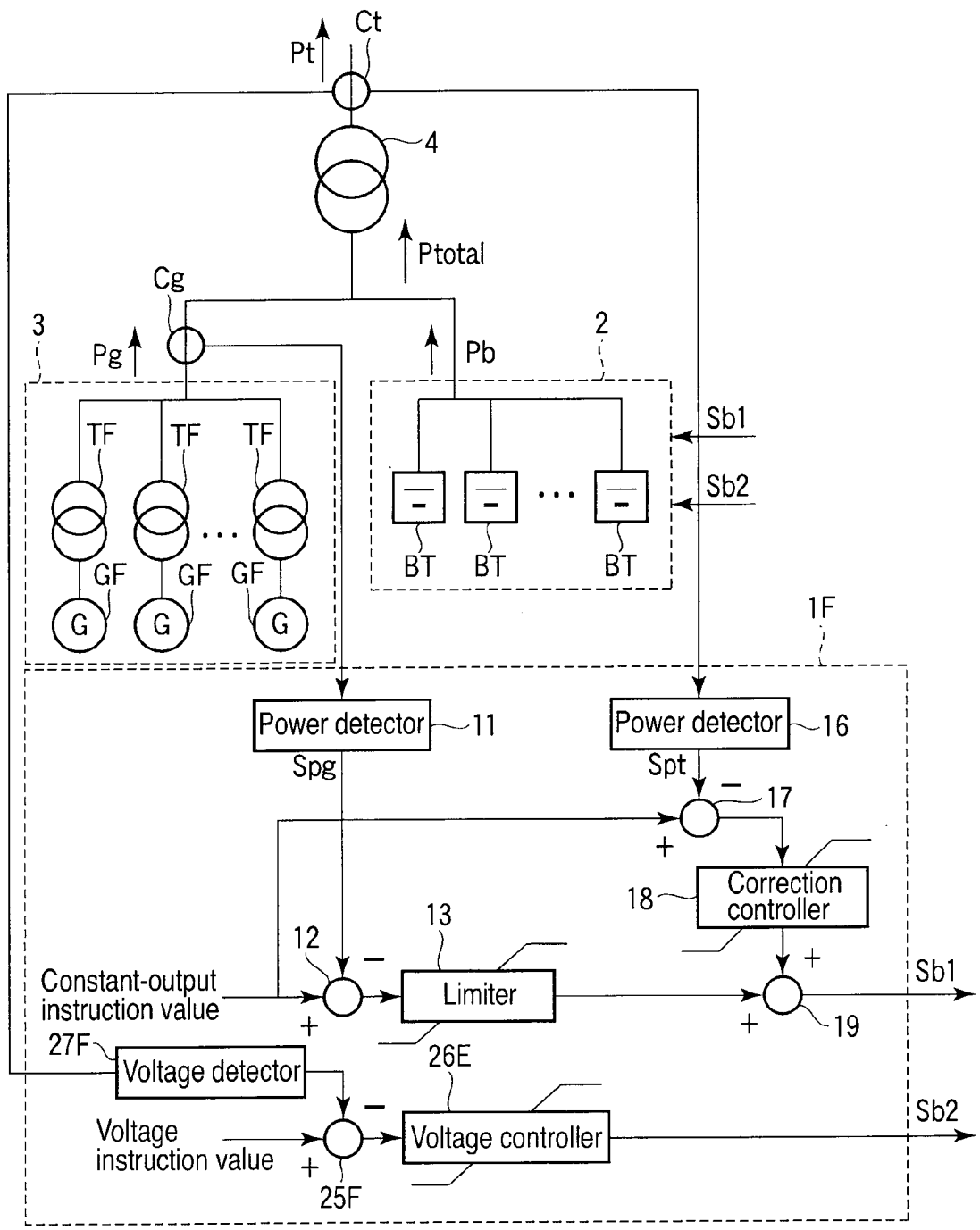
F I G. 7

OUTPUT-POWER CONTROL APPARATUS

CROSS-REFERENCE TO RELATED APPLICATIONS

This is a Continuation Application of PCT Application No. PCT/JP2008/071039, filed Nov. 19, 2008, which was published under PCT Article 21(2) in Japanese, the entire contents of which are incorporated herein by reference.

BACKGROUND OF THE INVENTION

1. Field of the Invention

The present invention relates to an output-power control apparatus for an electric power system using a secondary battery.

2. Description of the Related Art

There is a conventionally known secondary battery system which supplies an electric power by use of a secondary battery. For example, such a secondary battery system is used for storing an electric power at night (for example, see "The January Issue of Monthly Energy", The Nikkan Kogyo Shimbun, Ltd., Dec. 28, 2004, pp. 82 to 84).

However, nothing is conventionally known about control of the output power in an electric power system which supplies electric power, with a secondary battery system connected in parallel with a power generator.

Therefore, electric power output from an electric power system is difficult to control when the electric power system is configured by connecting a power generator, for which it is difficult to maintain a constant power generation amount, in parallel with a secondary battery.

BRIEF SUMMARY OF THE INVENTION

An object of the invention is to provide an output-power control apparatus capable of controlling an electric power output from an electric power system in which a secondary battery and a power generator are connected in parallel with each other.

According to an aspect of the present invention, there is provided an output-power control apparatus which is provided in an electric power system connecting a secondary battery provided with a power converter for controlling electric charge/discharge and a power generator in parallel and controls a total output power as a total of output powers from a power generator and a secondary battery, the output-power control apparatus comprising: a total-output-power-instruction output unit which outputs a total-output-power instruction for controlling the total output power; a power-generator-output-power detection unit which detects the output power from the power generator; a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit; and a secondary battery control unit which controls the power converter, based on the secondary-battery-charge/discharge power instruction calculated by the secondary-battery-charge/discharge-power instruction calculation unit.

BRIEF DESCRIPTION OF THE SEVERAL VIEWS OF THE DRAWING

FIG. 2 is a block diagram showing a configuration of an electric power system according to the second embodiment of the invention;

FIG. 3 is a block diagram showing a configuration of an electric power system according to the third embodiment of the invention;

FIG. 4 is a block diagram showing a configuration of an electric power system according to the fourth embodiment of the invention;

FIG. 6 is a block diagram showing a configuration of an electric power system according to the sixth embodiment of the invention; and FIG. 7 is a block diagram showing a configuration of a power system according to the seventh embodiment of the invention.

DETAILED DESCRIPTION OF THE INVENTION

Hereinafter, embodiments of the invention will be described with reference to the drawings.

First Embodiment

Figure 1:
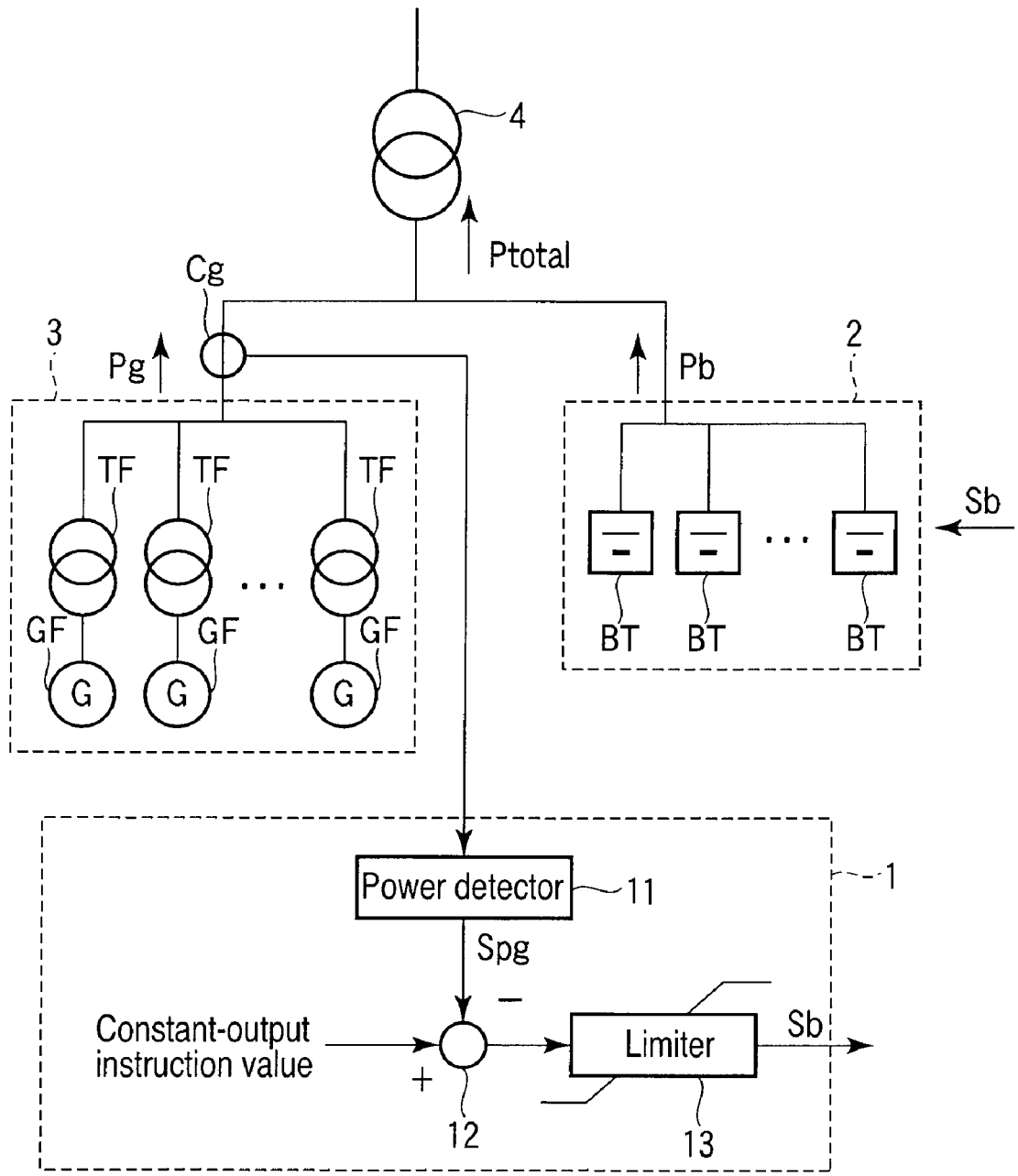
FIG. 1 is a block diagram showing a configuration of an electric power system according to the first embodiment of the invention.

FIG. 1 is a block diagram showing a configuration of an electric power system according to the first embodiment of the invention. Parts which are common to figures cited below are respectively denoted at common reference symbols. Reiterative detailed descriptions thereof will be omitted, and different parts between the figures will be mainly described. Reiterative descriptions to subsequent embodiments will be omitted as well.

The electric power system comprises an output-power control apparatus 1, a secondary battery system 2, a power generator 3, and a transformer 4. A converter Cg is provided on the output side of the power generator 3. The electric power system operates as a power plant.

In the secondary battery system 2, a plurality of secondary batteries BT are connected in parallel. The secondary batteries BT are, for example, sodium-sulfur batteries (NAS batteries). The secondary battery system 2 is provided with a power converter for charging/discharging the secondary batteries BT. Output power of the secondary battery system 2 is controlled by controlling the power converter through the output-power control apparatus 1.

The power generator 3 is configured by connecting a plurality of power generators GF in parallel respectively through their own transformers TF. For each of the power generators GF it is difficult to maintain a constant power generation amount. The power generators GF are, for example, aerogenerators, such as fan-driven generators.

The transformer 4 transforms output power Ptotal in potential, which is a total of an electric power Pb output from the secondary battery system 2 and an electric power Pg output from the power generator 3. The transformer 4 outputs the transformed output power to external power systems.

The converter Cg transmits, as a signal, an electric power amount Pg output from the power generator 3 to the output-power control apparatus 1. The position where the converter Cg is provided is a measuring point for the electric power amount Pg.

The output-power control apparatus 1 comprises a power detector 11, a subtractor 12, and a limiter 13.

The power detector 11 calculates the electric power amount Pg output from the power generator 3, based on the signal received from the converter Cg. The power detector 11 outputs the calculated electric power amount Pg, as a signal Spg, to the subtractor 12.

The subtractor 12 is input with a constant-output instruction value to make the electric power system output constant electric power. The subtractor 12 is input with the signal Spg from the power detector 11. The subtractor 12 subtracts signal Spg from the constant-output instruction value. A value obtained by the subtractor 12 is a base of an instruction value for the electric power amount Pg output from the secondary battery system 2. The subtractor 12 outputs the obtained value, as a signal, to the limiter 13.

If the signal input from the subtractor 12 is normal, the limiter 13 transmits, to the secondary battery system 2, the signal as an instruction value Sb for the electric power amount Pg output from the secondary battery system 2. If the signal input from the subtractor 12 is abnormal, the limiter 13 limits the instruction value Sb and transmits the limited instruction value Sb to the secondary battery system 2.

The output power of the secondary battery system 2 is controlled based on the instruction value Sb input from the limiter 13.

According to the present embodiment, the electric power output from the electric power system can be controlled to be equal to the constant-output instruction value wherein the electric power system is configured by connecting the secondary battery system 2 and the power generator 3 in parallel.

Second Embodiment

FIG. 2 is a block diagram showing a configuration of an electric power system according to the second embodiment of the invention.

In the electric power system, the output-power control apparatus 1 in the electric power system according to the first embodiment shown in FIG. 1 is substituted with an output-power control apparatus 1A, and a converter Cl is provided for a system which supplies an electric power for internal loads of the plant (house loads of the plant). The other features are configured in the same manner as in the electric power system according to the first embodiment.

The converter Cl transmits, as a signal, an electric power amount Pl supplied for house loads to the output-power control apparatus 1A. The position where the converter Cl is provided is a measuring point of the electric power amount Pl.

The output-power control apparatus 1A is configured by adding a power detector 14 and a subtractor 15 to the output-power control apparatus 1 shown in FIG. 1.

The power detector 14 calculates the electric power amount Pl supplied for house loads, based on the signal received from the converter Cl. The power detector 14 outputs the calculated electric power amount Pl as a signal Spl to the subtractor 15.

The subtractor 15 is input with a signal Spg from the power detector 11. The subtractor 15 is input with signal Spl from the power detector 14. The subtractor 15 subtracts signal Spl from signal Spg. The subtractor 15 outputs an obtained value to a subtractor 12A.

The subtractor 12A is input with a constant-output instruction value to make the electric power system output constant electric power. The subtractor 12A is input with a signal from the subtractor 15. The subtractor 12A subtracts the signal input from the subtractor 15, from the constant-output instruction value. A value obtained by the subtractor 12A is a base of an instruction value for the electric power amount Pg output from the secondary battery system 2. The subtractor 12A outputs the obtained value, as a signal, to the limiter 13.

If the signal input from the subtractor 12A is normal, the limiter 13 transmits, to the secondary battery system 2, the signal as an instruction value Sb for the electric power amount Pg output from the secondary battery system 2. If the signal input from the subtractor 12A is abnormal, the limiter 13 limits the instruction value Sb and transmits the limited instruction value Sb to the secondary battery system 2.

According to the present embodiment, the electric power output from the electric power system can be controlled to be equal to the constant-output instruction value and to compensate for variation of house loads wherein the electric power system is configured by connecting the secondary battery system 2 and the power generator 3 in parallel.

Third Embodiment

FIG. 3 is a block diagram showing a configuration of an electric power system according to the third embodiment of the invention.

In the electric power system, the output-power control apparatus 1 in the electric power system according to the first embodiment shown in FIG. 1 is substituted with an output-power control apparatus 1B, and a converter Ct is provided on the output side of a transformer 4. The other features are configured in the same manner as in the electric power system according to the first embodiment.

The converter Ct transmits, as a signal, an electric power amount Pt output from the transformer 4 to the output-power control apparatus 1B. The position where the converter Ct is provided is a measuring point of the electric power amount Pt.

The output-power control apparatus 1B is configured by adding a power detector 16, a subtractor 17, a correction controller 18, and an adder 19 to the output-power control apparatus 1 shown in FIG. 1.

The power detector 16 calculates the electric power amount Pt output from the transformer 4, based on the signal received from the converter Ct. The power detector 16 outputs the calculated electric power amount Pt as a signal Spt to the subtractor 17.

The subtractor 17 is input with a signal Spt from the power detector 16. The subtractor 17 is input with a constant-output instruction value to make the electric power system output constant electric power. The subtractor 17 subtracts signal Spt from the constant-output instruction value. The subtractor 17 outputs an obtained value as a signal to the correction controller 18.

Based on the signal input from the subtractor 17, the correction controller 18 calculates a correction value for the constant-output instruction value, to equalize the output electric power to the constant-output instruction value. The correction controller 18 outputs the calculated correction value to the adder 19.

The adder 19 is provided on the output side of the limiter 13. The adder 19 is input with a signal from the limiter 13. The adder 19 is input with the correction value as a signal from the correction controller 18. The adder 19 adds the signal from the limiter 13 and the signal from the correction controller 18. A value obtained by the adder 19 is transmitted to the secondary battery system 2, as an instruction value Sb for the electric power Pb output from the secondary battery system 2.

According to the present embodiment, the electric power output from the electric power system can be controlled to be equal to the constant-output instruction value and to compensate for loss of the transformer 4 and variation of house loads, wherein the electric power system is configured by connecting the secondary battery system 2 and the power generator 3 in parallel.

Fourth Embodiment

FIG. 4 is a block diagram showing a configuration of an electric power system according to the fourth embodiment of the invention.

In the electric power system, the output-power control apparatus 1A in the electric power system according to the second embodiment shown in FIG. 2 is substituted with an output-power control apparatus 10, and a converter Ct is provided on the output side of a transformer 4. The other features are configured in the same manner as in the electric power system according to the second embodiment.

The converter Ct transmits, as a signal, an electric power amount Pt output from the transformer 4 to the output-power control apparatus 1C. The position where the converter Ct is provided is a measuring point of the electric power amount Pt.

The output-power control apparatus 1C is configured by adding a power detector 16, a subtractor 17, a correction controller 18, and an adder 19 to the output-power control apparatus 1A shown in FIG. 2.

The power detector 16 calculates the electric power amount Pt output from the transformer 4, based on the signal received from the converter Ct. The power detector 16 outputs the calculated electric power amount Pt as a signal Spt to the subtractor 17.

The subtractor 17 is input with a signal Spt from the power detector 16. The subtractor 17 is input with a constant-output instruction value to make the electric power system output constant electric power. The subtractor 17 subtracts signal Spt from the constant-output instruction value. The subtractor 17 outputs an obtained value as a signal to the correction controller 18.

Based on the signal input from the subtractor 17, the correction controller 18 calculates a correction value for the constant-output instruction value, to equalize the output electric power to the constant-output instruction value. The correction controller 18 outputs the obtained correction value as a signal to the adder 19.

The adder 19 is provided on the output side of the limiter 13. The adder 19 is input with the correction value from the correction controller 18. The adder 19 adds the signal from the limiter 13 and the signal from the correction controller 18. A value obtained by the adder 19 is transmitted to the secondary battery system 2, as an instruction value Sb for the electric power Pb output from the secondary battery system 2.

According to the present embodiment, the electric power output from the electric power system can be controlled to be equal to the constant-output instruction value and to compensate for loss of the transformer 4 and variation of house loads, wherein the electric power system is configured by connecting the secondary battery system 2 and the power generator 3 in parallel.

Furthermore, in the output-power control apparatus 10, a circuit which compensates for variation of house loads is configured to be separate from a circuit which compensates for loss of the transformer 4. Therefore, the compensation for variation of house loads can be controlled with higher accuracy than in the third embodiment.

Fifth Embodiment

Figure 5:
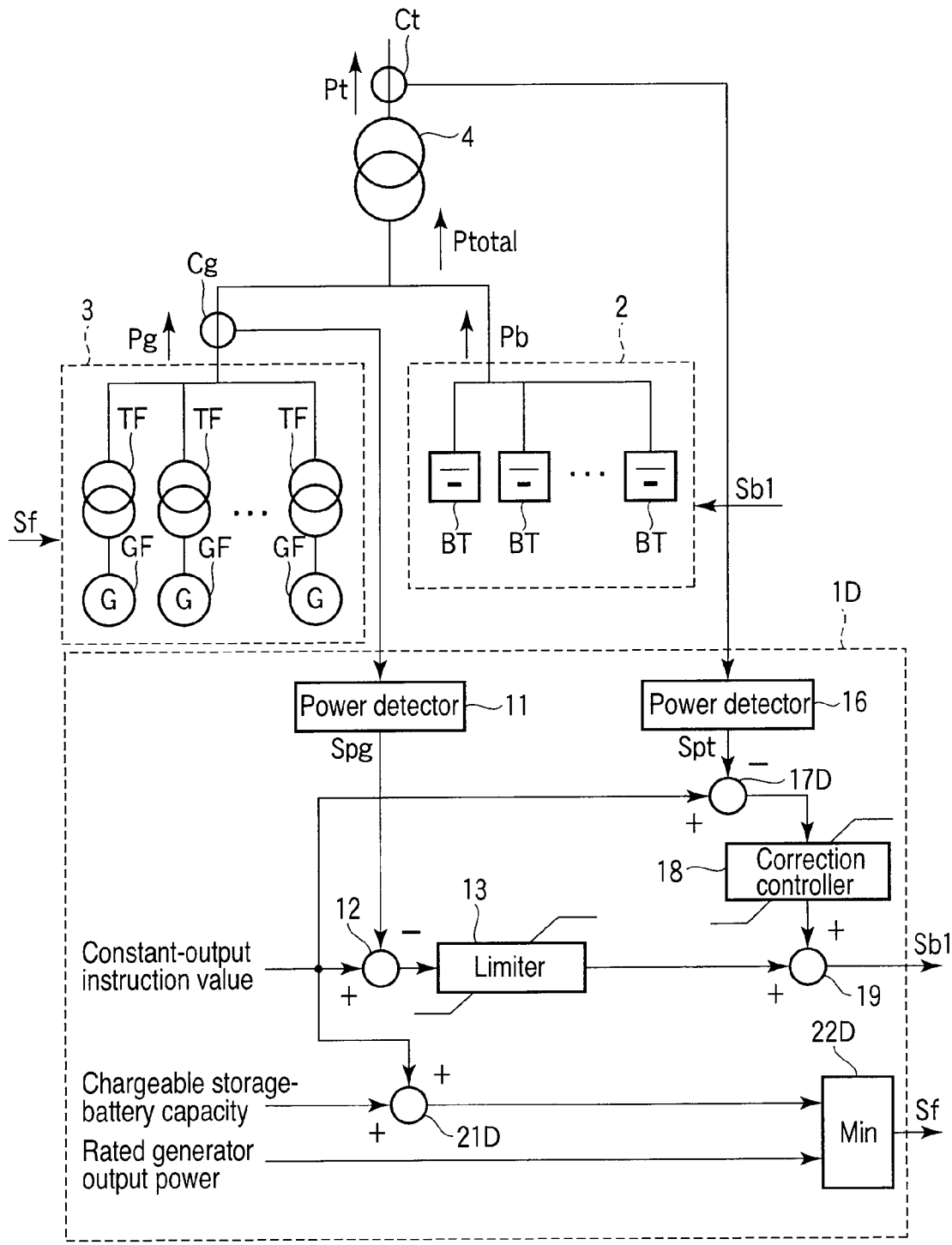
FIG. 5 is a block diagram showing a configuration of an electric power system according to the fifth embodiment of the invention.

FIG. 5 is a block diagram showing a configuration of an electric power system according to the fifth embodiment of the invention.

In the electric power system, the output-power control apparatus 1B in the electric power system according to the third embodiment shown in FIG. 3 is substituted with an output-power control apparatus 1D. The other features are configured in the same manner as in the electric power system according to the third embodiment.

The output-power control apparatus 1D is configured by substituting the subtractor 17 in the output-power control apparatus 1B in FIG. 3 with a subtractor 17D, and by adding an adder 21D and a comparator 22D.

A value obtained by an adder 19 is transmitted, to a secondary battery system 2, as an instruction value Sb1 for an active electric power of an electric power Pb output from the secondary battery system 2.

The adder 21D is input with a constant-output instruction value and a chargeable storage-battery capacity. The chargeable storage-battery capacity is an electric power amount which can be charged in the secondary battery system 2. The adder 21D adds the constant-output instruction value and the chargeable storage-battery capacity. The adder 21D outputs an obtained value as a signal to the comparator 22D.

The comparator 22D is input with the signal from the adder 21D. The comparator 22D is input with a rated generator output power. The rated generator output power is a rated output power of the power generator 3. The comparator 22D compares the value obtained by the adder 21D with the rated generator output power, and obtains a smaller one in between. The comparator 22D transmits, to the power generator 3, the obtained value as an instruction value Sf for an upper limit to the output power of the power generator 3.

According to the present embodiment, operations and effects as described below can be obtained in addition to operations and effects of the third embodiment.

The output-power control apparatus 1D can prevent excessive power generation of the power generator 3 by suppressing the output power of the power generator 3 in consideration of the chargeable storage-battery capacity. In this manner, excessive power generation of the power generator 3 is prevented, and the electric power output from the electric power system can be controlled to be equal to the constant-output instruction value.

Sixth Embodiment

FIG. 6 is a block diagram showing a configuration of an electric power system according to the sixth embodiment of the invention.

In the electric power system, the output-power control apparatus 1B in the electric power system according to the third embodiment shown in FIG. 3 is substituted with an output-power control apparatus 1E. The other features are configured in the same manner as in the electric power system according to the third embodiment.

The output-power control apparatus 1E is configured by substituting the subtractor 16 in the output-power control apparatus 1B in FIG. 3 with a power detector 16E, and by adding a subtractor 25E and a voltage controller 26E.

The power detector 16E calculates an electric power amount Pt output from a transformer 4, based on a signal received from a converter Ct. The power detector 16E outputs the calculated electric power amount Pt as a signal Spt to a subtractor 17. The power detector 16E outputs, as a signal, a reactive electric power of the electric power amount Pt output from a transformer 4.

The subtractor 25E is input with a reactive-power instruction value. The reactive-power instruction value is to control the reactive electric power of the electric power amount Pt output from the transformer 4. The subtractor 25E is input with, as a signal, a value indicating the reactive electric power of the electric power amount Pt from the power detector 16E. The subtractor 25E subtracts the reactive electric power of the electric power amount Pt from the reactive-power instruction value. The subtractor 25E outputs an obtained value as a signal to the voltage controller 26E.

Based on the signal input from the subtractor 25E, the voltage controller 26E transmits, to a secondary battery system 2, an instruction value Sb2 for the reactive electric power of the electric power Pb output from the secondary battery system 2. That is, the voltage controller 26E controls the output voltage of the secondary battery system 2 in order to equalize the reactive electric power of the electric power Pb output from the secondary battery system 2 to the reactive-power instruction value.

According to the present embodiment, operations and effects as described below can be obtained in addition to operations and effects of the third embodiment.

The output-power control apparatus 1E can control the active power of the output power of the electric power system to be constant, as well as the reactive power to be constant. This control utilizes ability of a power converter for a storage battery to control the active power and the reactive power independently from each other, wherein the power converter is provided for the secondary battery system 2.

For example, the output-power control apparatus 1E can compensate for the reactive power in the plant as a power factor of 1.0 by setting the reactive power instruction value to zero.

Seventh Embodiment

FIG. 7 is a block diagram showing a configuration of an electric power system according to the seventh embodiment of the invention.

In the electric power system, the output-power control apparatus 1E in the electric power system according to the sixth embodiment shown in FIG. 6 is substituted with an output-power control apparatus 1F. The other features are configured in the same manner as in the electric power system according to the sixth embodiment.

The output-power control apparatus 1F is configured by substituting the subtractor 16E in the output-power control apparatus 1E in FIG. 6 with a power detector 16, as well as the subtractor 25E with a subtractor 25F, and by adding a voltage detector 27F.

The voltage detector 27F calculates an electric power amount output from a transformer 4, based on a signal received from a converter Ct. The voltage detector 27F outputs the calculated electric power amount as a signal to the subtractor 25F.

The subtractor 25F is input with a voltage instruction value. The voltage instruction value is to control a voltage output from the transformer 4. The subtractor 25F is input with a value of a voltage as a signal from the voltage detector 27F. The subtractor 25F subtracts a voltage input from the voltage detector 27F, from the voltage instruction value. The subtractor 25F outputs an obtained value as a signal to the voltage controller 26E.

Based on the signal input from the subtractor 25F, the voltage controller 26E transmits, to a secondary battery system 2, an instruction value Sb2 for a reactive electric power of an electric power Pb output from the secondary battery system 2. That is, the voltage controller 26E controls the output voltage of the secondary battery system 2 in order to equalize the reactive electric power of the electric power Pb output from the secondary battery system 2 to a reactive-power instruction value.

According to the present embodiment, the same operations and effects as those of the sixth embodiment can be obtained. Furthermore, a configuration of detecting the output voltage of the transformer 4 is provided independently, and accuracy of controlling the reactive power can therefore be improved higher than in sixth embodiment.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. An output-power control apparatus which is provided in an electric power system connecting a secondary battery provided with a power converter for controlling electric charge/discharge and a power generator in parallel and controls a total output power as a total of output powers from the power generator and the secondary battery, wherein the electric power system is connected to a load, and wherein the output-power control apparatus comprises:

a total-output-power-instruction output unit which outputs a total-output-power instruction for controlling the total output power;

a power-generator-output-power detection unit which detects the output power from the power generator;

a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;

a secondary battery control unit which controls the power converter, based on the secondary-battery-charge/discharge power instruction calculated by the secondary-battery-charge/discharge-power instruction calculation unit;

a load-power detection unit which detects an electric power supplied for the load;

a total-output-power detection unit which detects the total output power;

a correction-amount calculation unit which calculates a correction amount for correcting the secondary-battery-charge/discharge power instruction calculated by the secondary-battery-charge/discharge-power instruction calculation unit, based on the total output power detected by the total-output-power detection unit and based on the total-output-power instruction output by the total-output-power-instruction output unit;

a secondary-battery-charge/discharge-power correction unit which corrects the secondary-battery-charge/discharge power instruction calculated by the secondary-battery charge/discharge-power instruction calculation unit, based on the correction amount calculated by the correction-amount calculation unit; and a power-generator-output power limit unit which limits the output power from the power generator to a smaller one of a total electric power and a rated output of the power generator by comparing the total electric power and the rated output with each other, the total electric power being a total of the total output power depending on the total-output-power instruction which is output by the total-output-power-instruction output unit and an electric power which is chargeable in the secondary battery; wherein:
the secondary-battery-charge/discharge-power instruction calculation unit calculates the secondary-battery-charge/discharge power instruction, based on the electric power detected by the load-power detection unit; and
the secondary battery control unit controls the power converter, based on the secondary-battery-charge/discharge power instruction corrected by the secondary-battery-charge/discharge-power correction unit.

2. The output-power control apparatus of claim 1, further comprising:
a reactive-power calculation unit which calculates a reactive power of the total output power detected by the total-output-power detection unit;
a reactive-power-instruction output unit which outputs a reactive power instruction for controlling a reactive power of the total output power; and
a reactive-power control unit which controls the power converter for controlling the reactive power of the total output power, based on the reactive power calculated by the reactive power calculation unit and based on the reactive power instruction output by the reactive-power-instruction output unit.

3. The output-power control apparatus of claim 1, further comprising:
a voltage detection unit which detects a voltage of the total output power;
a voltage-instruction output unit which outputs a voltage instruction for controlling the voltage of the total output power; and
a reactive power control unit which controls the power converter for controlling the reactive power of the total output power, based on the voltage detected by the voltage detection unit and based on the voltage instruction output by the voltage-instruction output unit.

4. An output-power control apparatus which is provided in an electric power system connecting a secondary battery provided with a power converter for controlling electric charge/discharge and a power generator in parallel and controls a total output power as a total of output powers from the power generator and the secondary battery, wherein the electric power system is connected to a load, and wherein the output-power control apparatus comprises:
a total-output-power-instruction output unit which outputs a total-output-power instruction for controlling the total output power;
a power-generator-output-power detection unit which detects the output power from the power generator;
a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;
a secondary battery control unit which controls the power converter, based on the secondary-battery-charge/discharge power instruction calculated by the secondary-battery-charge/discharge-power instruction calculation unit;
a load-power detection unit which detects an electric power supplied for the load;
a total-output-power detection unit which detects the total output power;
a correction-amount calculation unit which calculates a correction amount for correcting the secondary-battery-charge/discharge power instruction calculated by the secondary-battery-charge/discharge-power instruction calculation unit, based on the total output power detected by the total-output-power detection unit and based on the total-output-power instruction output by the total-output-power-instruction output unit;
a secondary-battery-charge/discharge-power correction unit which corrects the secondary-battery-charge/discharge power instruction calculated by the secondary-battery charge/discharge-power instruction calculation unit, based on the correction amount calculated by the correction-amount calculation unit-a voltage detection unit which detects a voltage of the total output power;
a voltage-instruction output unit which outputs a voltage instruction for controlling the voltage of the total output power; and
a reactive power control unit which controls the power converter for controlling the reactive power of the total output power, based on the voltage detected by the voltage detection unit and based on the voltage instruction output by the voltage-instruction output unit;
wherein:
the secondary-battery-charge/discharge-power instruction calculation unit calculates the secondary-battery-charge/discharge power instruction, based on the electric power detected by the load-power detection unit; and
the secondary battery control unit controls the power converter, based on the secondary-battery-charge/discharge power instruction corrected by the secondary-battery-charge/discharge-power correction unit.

5. An output-power control apparatus which is provided in an electric power system connecting a secondary battery provided with a power converter for controlling electric charge/discharge and a power generator in parallel and controls a total output power as a total of output powers from the power generator and the secondary battery, the output-power control apparatus comprising:
a total-output-power-instruction output unit which outputs a total-output-power instruction for controlling the total output power;
a power-generator-output-power detection unit which detects the output power from the power generator;
a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit; and
a secondary battery control unit which controls the power converter, based on the secondary-battery-charge/discharge power instruction calculated by the secondary-battery-charge/discharge-power instruction calculation unit;

wherein the electric power system is connected to a load; and wherein the output-power control apparatus further comprises:

a load-power detection unit which detects an electric power supplied for the load, wherein the secondary-battery-charge/discharge-power instruction calculation unit calculates the secondary-battery-charge/discharge power instruction, based on the electric power detected by the load-power detection unit; and a power-generator-output power limit unit which limits the output power from the power generator to a smaller one of a total electric power and a rated output of the power generator by comparing the total electric power and the rated output with each other, the total electric power being a total of the total output power depending on the total-output-power instruction which is output by the total-output-power-instruction output unit and an electric power which is chargeable in the secondary battery.

6. The output-power control apparatus of claim 5, further comprising:

a reactive-power calculation unit which calculates a reactive power of the total output power detected by the total-output-power detection unit;

a reactive-power-instruction output unit which outputs a reactive power instruction for controlling a reactive power of the total output power; and a reactive-power control unit which controls the power converter for controlling the reactive power of the total output power, based on the reactive power calculated by the reactive power calculation unit and based on the reactive power instruction output by the reactive-power-instruction output unit.

7. The output-power control apparatus of claim 5, further comprising:

a voltage detection unit which detects a voltage of the total output power;

a voltage-instruction output unit which outputs a voltage instruction for controlling the voltage of the total output power; and a reactive power control unit which controls the power converter for controlling the reactive power of the total output power, based on the voltage detected by the voltage detection unit and based on the voltage instruction output by the voltage-instruction output unit.

8. An output-power control apparatus which is provided in an electric power system connecting a secondary battery provided with a power converter for controlling electric charge/discharge and a power generator in parallel and controls a total output power as a total of output powers from the power generator and the secondary battery, wherein the electric power system is connected to a load, and wherein the output-power control apparatus comprises:

a total-output-power-instruction output unit which outputs a total-output-power instruction for controlling the total output power;

a power-generator-output-power detection unit which detects the output power from the power generator;

a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;

a secondary battery control unit which controls the power converter, based on the secondary-battery-charge/discharge power instruction calculated by the secondary-battery-charge/discharge-power instruction calculation unit;

a total-output-power detection unit which detects the total output power;

a correction-amount calculation unit which calculates a correction amount for correcting the secondary-battery-charge/discharge power instruction calculated by the secondary-battery-charge/discharge-power instruction calculation unit, based on the total output power detected by the total-output-power detection unit and based on the total-output-power instruction output by the total-output-power-instruction output unit;

a secondary-battery-charge/discharge-power correction unit which corrects the secondary-battery-charge/discharge power instruction calculated by the secondary-battery-charge/discharge-power instruction calculation unit, based on the correction amount calculated by the correction-amount calculation unit; and a power-generator-output power limit unit which limits the output power from the power generator to a smaller one of a total electric power and a rated output of the power generator by comparing the total electric power and the rated output with each other, the total electric power being a total of the total output power depending on the total-output-power instruction which is output by the total-output-power-instruction output unit and an electric power which is chargeable in the secondary battery;

wherein the secondary battery control unit controls the power converter, based on the secondary-battery-charge/discharge power instruction corrected by the secondary-battery-charge/discharge-power correction unit.

9. The output-power control apparatus of claim 8, further comprising:

a reactive-power calculation unit which calculates a reactive power of the total output power detected by the total-output-power detection unit;

a reactive-power-instruction output unit which outputs a reactive power instruction for controlling a reactive power of the total output power; and a reactive-power control unit which controls the power converter for controlling the reactive power of the total output power, based on the reactive power calculated by the reactive power calculation unit and based on the reactive power instruction output by the reactive-power-instruction output unit.

10. The output-power control apparatus of claim 8, further comprising:

a voltage detection unit which detects a voltage of the total output power;

a voltage-instruction output unit which outputs a voltage instruction for controlling the voltage of the total output power; and a reactive power control unit which controls the power converter for controlling the reactive power of the total output power, based on the voltage detected by the voltage detection unit and based on the voltage instruction output by the voltage-instruction output unit.

11. An output-power control apparatus which is provided in an electric power system connecting a secondary battery provided with a power converter for controlling electric charge/discharge and a power generator in parallel and controls a total output power as a total of output powers from the power generator and the secondary battery, wherein the electric power system is connected to a load, and wherein the output-power control apparatus comprises:
a total-output-power-instruction output unit which outputs a total-output-power instruction for controlling the total output power;
a power-generator-output-power detection unit which detects the output power from the power generator;
a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;
a secondary battery control unit which controls the power converter, based on the secondary-battery-charge/discharge power instruction calculated by the secondary-battery-charge/discharge-power instruction calculation unit;
a total-output-power detection unit which detects the total output power;
a correction-amount calculation unit which calculates a correction amount for correcting the secondary-battery-charge/discharge power instruction calculated by the secondary-battery-charge/discharge-power instruction calculation unit, based on the total output power detected by the total-output-power detection unit and based on the total-output-power instruction output by the total-output-power-instruction output unit;
a secondary-battery-charge/discharge-power correction unit which corrects the secondary-battery-charge/discharge power instruction calculated by the secondary-battery-charge/discharge-power instruction calculation unit, based on the correction amount calculated by the correction-amount calculation unit;
a voltage detection unit which detects a voltage of the total output power;
a voltage-instruction output unit which outputs a voltage instruction for controlling the voltage of the total output power; and
a reactive power control unit which controls the power converter for controlling the reactive power of the total output power, based on the voltage detected by the voltage detection unit and based on the voltage instruction output by the voltage-instruction output unit;
wherein the secondary-battery control unit controls the power converter, based on the secondary-battery-charge/discharge power instruction corrected by the secondary-battery-charge/discharge-power correction unit.

12. An output-power control apparatus which is provided in an electric power system connecting a secondary battery provided with a power converter for controlling electric charge/discharge and a power generator in parallel and controls a total output power as a total of output powers from the power generator and the secondary battery, wherein the electric power system is connected to a load, and wherein the output-power control apparatus comprises:
a total-output-power-instruction output unit which outputs a total-output-power instruction for controlling the total output power;
a power-generator-output-power detection unit which detects the output power from the power generator;
a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;
a secondary battery control unit which controls the power converter, based on the secondary-battery-charge/discharge power instruction calculated by the secondary-battery-charge/discharge-power instruction calculation unit; and
a power-generator-output power limit unit which limits the output power from the power generator to a smaller one of a total electric power and a rated output of the power generator by comparing the total electric power and the rated output with each other, the total electric power being a total of the total output power depending on the total-output-power instruction which is output by the total-output-power-instruction output unit and an electric power which is chargeable in the secondary battery.

13. The output-power control apparatus of claim 12, further comprising:
a reactive-power calculation unit which calculates a reactive power of the total output power detected by the total-output-power detection unit;
a reactive-power-instruction output unit which outputs a reactive power instruction for controlling a reactive power of the total output power; and
a reactive-power control unit which controls the power converter for controlling the reactive power of the total output power, based on the reactive power calculated by the reactive power calculation unit and based on the reactive power instruction output by the reactive-power-instruction output unit.

14. The output-power control apparatus of claim 12, further comprising:
a voltage detection unit which detects a voltage of the total output power;
a voltage-instruction output unit which outputs a voltage instruction for controlling the voltage of the total output power; and
a reactive power control unit which controls the power converter for controlling the reactive power of the total output power, based on the voltage detected by the voltage detection unit and based on the voltage instruction output by the voltage-instruction output unit.

15. An electric power system comprising:
a secondary battery;
a power converter which controls electric charge/discharge to/from the secondary battery;
a power generator connected in parallel with the secondary battery;
a total-output-power-instruction output unit which outputs a total-output power instruction for controlling a total output power as a total of output powers from the power generator and the secondary battery;
a power-generator-output-power detection unit which detects the output power from the power generator;
a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;

a secondary battery control unit which controls the power converter, based on the secondary-battery-charge/discharge power instruction calculated by the secondary-battery-charge/discharge-power instruction calculation unit;

a load supplied with an electric power from the secondary battery and the power generator;

a load-power detection unit which detects the electric power supplied to the load, wherein the secondary-battery-charge/discharge-power instruction calculation unit calculates the secondary-battery-charge/discharge power instruction, based on the electric power detected by the load-power detection unit;

a total-output-power detection unit which detects the total output power;

a correction-amount calculation unit which calculates a correction amount for correcting the secondary-battery-charge/discharge power instruction calculated by the secondary-battery-charge/discharge-power instruction calculation unit, based on the total output power detected by the total-output-power detection unit and based on the total-output-power instruction output by the total-output-power-instruction output unit;

a secondary-battery-charge/discharge-power correction unit which corrects the secondary-battery-charge/discharge power instruction calculated by the secondary-battery charge/discharge-power instruction calculation unit, based on the correction amount calculated by the correction-amount calculation unit; and a power-generator-output-power limit unit which limits the output power from the power generator to a smaller one of a total electric power and a rated output of the power generator, the total electric power being a total of the total output power depending on the total-output-power instruction which is output by the total-output-power-instruction output unit and an electric power which is chargeable in the secondary battery;

wherein the secondary battery control unit controls the power converter, based on the secondary-battery-charge/discharge power instruction corrected by the secondary-battery-charge/discharge-power correction unit.

16. The electric power system of claim 15, further comprising:

a reactive-power calculation unit which calculates a reactive power of the total output power detected by the total-output-power detection unit;

a reactive-power-instruction output unit which outputs a reactive power instruction for controlling a reactive power of the total output power; and a reactive-power control unit which controls the power converter for controlling the reactive power of the total output power, based on the reactive power calculated by the reactive power calculation unit and based on the reactive power instruction output by the reactive-power-instruction output unit.

17. The electric power system of claim 15, further comprising:

a voltage detection unit which detects a voltage of the total output power;

a voltage-instruction output unit which outputs a voltage instruction for controlling the voltage of the total output power; and a reactive power control unit which controls the power converter for controlling the reactive power of the total output power, based on the voltage detected by the voltage detection unit and based on the voltage instruction output by the voltage-instruction output unit.

18. An electric power system comprising:

a secondary battery;

a power converter which controls electric charge/discharge to/from the secondary battery;

a power generator connected in parallel with the secondary battery;

a total-output-power-instruction output unit which outputs a total-output power instruction for controlling a total output power as a total of output powers from the power generator and the secondary battery;

a power-generator-output-power detection unit which detects the output power from the power generator;

a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;

a secondary battery control unit which controls the power converter, based on the secondary-battery-charge/discharge power instruction calculated by the secondary-battery-charge/discharge-power instruction calculation unit;

a load supplied with an electric power from the secondary battery and the power generator;

a load-power detection unit which detects the electric power supplied to the load, wherein the secondary-battery-charge/discharge-power instruction calculation unit calculates the secondary-battery-charge/discharge power instruction, based on the electric power detected by the load-power detection unit;

a total-output-power detection unit which detects the total output power;

a correction-amount calculation unit which calculates a correction amount for correcting the secondary-battery-charge/discharge power instruction calculated by the secondary-battery-charge/discharge-power instruction calculation unit, based on the total output power detected by the total-output-power detection unit and based on the total-output-power instruction output by the total-output-power-instruction output unit;

a secondary-battery-charge/discharge-power correction unit which corrects the secondary-battery-charge/discharge power instruction calculated by the secondary-battery charge/discharge-power instruction calculation unit, based on the correction amount calculated by the correction-amount calculation unit;

a voltage detection unit which detects a voltage of the total output power;

a voltage-instruction output unit which outputs a voltage instruction for controlling the voltage of the total output power; and a reactive power control unit which controls the power converter for controlling the reactive power of the total output power, based on the voltage detected by the voltage detection unit and based on the voltage instruction output by the voltage-instruction output unit;

wherein the secondary battery control unit controls the power converter, based on the secondary-battery-charge/discharge power instruction corrected by the secondary-battery-charge/discharge power correction unit.

19. An electric power system comprising:
a secondary battery;
a power converter which controls electric charge/discharge to/from the secondary battery;
a power generator connected in parallel with the secondary battery;
a total-output-power-instruction output unit which outputs a total-output power instruction for controlling a total output power as a total of output powers from the power generator and the secondary battery;
a power-generator-output-power detection unit which detects the output power from the power generator;
a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;
a secondary battery control unit which controls the power converter, based on the secondary-battery-charge/discharge power instruction calculated by the secondary-battery-charge/discharge-power instruction calculation unit;
a load supplied with an electric power from the secondary battery and the power generator;
a load-power detection unit which detects the electric power supplied to the load, wherein the secondary-battery-charge/discharge-power instruction calculation unit calculates the secondary-battery-charge/discharge power instruction, based on the electric power detected by the load-power detection unit; and
a power-generator-output-power limit unit which limits the output power from the power generator to a smaller one of a total electric power and a rated output of the power generator, the total electric power being a total of the total output power depending on the total-output-power instruction which is output by the total-output-power-instruction output unit and an electric power which is chargeable in the secondary battery.

20. The electric power system of claim 19, further comprising:
a reactive-power calculation unit which calculates a reactive power of the total output power detected by the total-output-power detection unit;
a reactive-power-instruction output unit which outputs a reactive power instruction for controlling a reactive power of the total output power; and
a reactive-power control unit which controls the power converter for controlling the reactive power of the total output power, based on the reactive power calculated by the reactive power calculation unit and based on the reactive power instruction output by the reactive-power-instruction output unit.

21. The electric power system of claim 19, further comprising:
a voltage detection unit which detects a voltage of the total output power;
a voltage-instruction output unit which outputs a voltage instruction for controlling the voltage of the total output power; and
a reactive power control unit which controls the power converter for controlling the reactive power of the total output power, based on the voltage detected by the voltage detection unit and based on the voltage instruction output by the voltage-instruction output unit.

22. An electric power system comprising:
a secondary battery;
a power converter which controls electric charge/discharge to/from the secondary battery;
a power generator connected in parallel with the secondary battery;
a total-output-power-instruction output unit which outputs a total-output power instruction for controlling a total output power as a total of output powers from the power generator and the secondary battery;
a power-generator-output-power detection unit which detects the output power from the power generator;
a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;
a secondary battery control unit which controls the power converter, based on the secondary-battery-charge/discharge power instruction calculated by the secondary-battery-charge/discharge-power instruction calculation unit;
a total-output-power detection unit which detects the total output power;
a correction-amount calculation unit which calculates a correction amount for correcting the secondary-battery-charge/discharge power instruction calculated by the secondary-battery-charge/discharge-power instruction calculation unit, based on the total output power detected by the total-output-power detection unit and based on the total-output-power instruction output by the total-output-power-instruction output unit;
a secondary-battery-charge/discharge-power correction unit which corrects the secondary-battery-charge/discharge power instruction calculated by the secondary-battery charge/discharge-power instruction calculation unit, based on the correction amount calculated by the correction-amount calculation unit; and
a power-generator-output-power limit unit which limits the output power from the power generator to a smaller one of a total electric power and a rated output of the power generator, the total electric power being a total of the total output power depending on the total-output-power instruction which is output by the total-output-power-instruction output unit and an electric power which is chargeable in the secondary battery;
wherein the secondary battery control unit controls the power converter, based on the secondary-battery-charge/discharge power instruction corrected by the secondary-battery-charge/discharge-power correction unit.

23. The electric power system of claim 22, further comprising:
a reactive-power calculation unit which calculates a reactive power of the total output power detected by the total-output-power detection unit;
a reactive-power-instruction output unit which outputs a reactive power instruction for controlling a reactive power of the total output power; and
a reactive-power control unit which controls the power converter for controlling the reactive power of the total output power, based on the reactive power calculated by the reactive power calculation unit and based on the reactive power instruction output by the reactive-power-instruction output unit.

24. The electric power system of claim 22, further comprising:
- a voltage detection unit which detects a voltage of the total output power;
- a voltage-instruction output unit which outputs a voltage instruction for controlling the voltage of the total output power; and
- a reactive power control unit which controls the power converter for controlling the reactive power of the total output power, based on the voltage detected by the voltage detection unit and based on the voltage instruction output by the voltage-instruction output unit.

25. An electric power system comprising:
- a secondary battery;
- a power converter which controls electric charge/discharge to/from the secondary battery;
- a power generator connected in parallel with the secondary battery;
- a total-output-power-instruction output unit which outputs a total-output power instruction for controlling a total output power as a total of output powers from the power generator and the secondary battery;
- a power-generator-output-power detection unit which detects the output power from the power generator;
- a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;
- a secondary battery control unit which controls the power converter, based on the secondary-battery-charge/discharge power instruction calculated by the secondary-battery-charge/discharge-power instruction calculation unit;
- a total-output-power detection unit which detects the total output power;
- a correction-amount calculation unit which calculates a correction amount for correcting the secondary-battery-charge/discharge power instruction calculated by the secondary-battery-charge/discharge-power instruction calculation unit, based on the total output power detected by the total-output-power detection unit and based on the total-output-power instruction output by the total-output-power-instruction output unit;
- a secondary-battery-charge/discharge-power correction unit which corrects the secondary-battery-charge/discharge power instruction calculated by the secondary-battery charge/discharge-power instruction calculation unit, based on the correction amount calculated by the correction-amount calculation unit-a voltage detection unit which detects a voltage of the total output power;
- a voltage-instruction output unit which outputs a voltage instruction for controlling the voltage of the total output power; and
- a reactive power control unit which controls the power converter for controlling the reactive power of the total output power, based on the voltage detected by the voltage detection unit and based on the voltage instruction output by the voltage-instruction output unit;

wherein the secondary battery control unit controls the power converter, based on the secondary-battery-charge/discharge power instruction corrected by the secondary-battery-charge/discharge-power correction unit.

26. An electric power system comprising:
- a secondary battery;
- a power converter which controls electric charge/discharge to/from the secondary battery;
- a power generator connected in parallel with the secondary battery;
- a total-output-power-instruction output unit which outputs a total-output power instruction for controlling a total output power as a total of output powers from the power generator and the secondary battery;
- a power-generator-output-power detection unit which detects the output power from the power generator;
- a secondary-battery-charge/discharge-power instruction calculation unit which calculates a secondary-battery-charge/discharge power instruction for controlling an electric power to be charged to or discharged from the secondary battery, based on the total output power instruction output by the total-output-power-instruction output unit and based on the output power from the power generator detected by the power-generator-output-power detection unit;
- a secondary battery control unit which controls the power converter, based on the secondary-battery-charge/discharge power instruction calculated by the secondary-battery-charge/discharge-power instruction calculation unit; and
- a power-generator-output-power limit unit which limits the output power from the power generator to a smaller one of a total electric power and a rated output of the power generator, the total electric power being a total of the total output power depending on the total-output-power instruction which is output by the total-output-power-instruction output unit and an electric power which is chargeable in the secondary battery.

27. The electric power system of claim 26, further comprising:
- a reactive-power calculation unit which calculates a reactive power of the total output power detected by the total-output-power detection unit;
- a reactive-power-instruction output unit which outputs a reactive power instruction for controlling a reactive power of the total output power; and
- a reactive-power control unit which controls the power converter for controlling the reactive power of the total output power, based on the reactive power calculated by the reactive power calculation unit and based on the reactive power instruction output by the reactive-power-instruction output unit.

28. The electric power system of claim 26, further comprising:
- a voltage detection unit which detects a voltage of the total output power;
- a voltage-instruction output unit which outputs a voltage instruction for controlling the voltage of the total output power; and
- a reactive power control unit which controls the power converter for controlling the reactive power of the total output power, based on the voltage detected by the voltage detection unit and based on the voltage instruction output by the voltage-instruction output unit.

* * * * *